UNITED STATES PATENT OFFICE

GEORGE A. FREAR, OF CHICAGO, ILLINOIS.

IMPROVEMENT IN THE MANUFACTURE OF ARTIFICIAL MARBLE.

Specification forming part of Letters Patent No. 106,263, dated August 9, 1870.

*To all whom it may concern:*

Be it known that I, GEORGE A. FREAR, of Chicago, in the county of Cook and State of Illinois, have invented a new and useful Improvement in the Production of Artificial Marble, of which the following is a specification:

The nature of my invention consists in the use of a solution of sulphate of zinc, chloride of zinc, sugar of lead, and pulverized alum or rock-salt, one or both, in suitable proportions, dissolved in water, for the purpose of cementing together and uniting particles of silex, alumina, calcium, or other kindred substances taken singly or in combination, to produce a hard and durable artificial marble for useful and ornamental purposes, and also imitations of all kinds and varieties of natural marbles.

The solution for moistening the compound is best obtained by taking from two to four ounces of sulphate of zinc, from two to four ounces of chloride of zinc, from two to four ounces of sugar of lead, from two to four ounces of pulverized alum or four ounces of rock-salt, either or both, and dissolving the same in one gallon of hot or warm rain-water; but the proportions of each ingredient may be still further varied, not only according to the strength and quality thereof, but also for the purpose of varying the character and quality of the marble produced therewith. The character of water used may also be changed where rain-water cannot be procured in sufficient quantity.

To produce a firm and durable marble impervious to moisture, I dampen with the foregoing solution a mixture of about one part of marble-cement or hydraulic cement, one part of ground silex, one part of barytes, and one-tenth of one part of gypsum, and form the same into a pasty mass of about the consistency of mortar, and then run the same into suitable molds. The composition will rapidly set and harden in the molds, and in eight or ten hours may be removed and laid out on boards exposed to the air to thoroughly dry and harden.

It is advantageous and preferable to compress the composition in the molds either by tamping or by suitable machinery, although this is not essential, and a good hard stone is produced without it.

By adding suitable coloring matters to the composition when it is in its plastic state, or to the solution with which it is moistened, as described, beautiful imitations of all varieties of marbles may be readily obtained.

The composition will rapidly harden when removed from the molds, and is in a few days ready for polishing.

The artificial marble thus obtained is ready for use in its rough state; but to produce a more finished article, I contemplate washing the face or surface thereof, one or two days after it has been molded, as described, with my zinc solution, repeating the washing two or three days in succession, and at the same time filling up any small cavities or defects caused by air in the molds with some of the mixture composing the stone, made thin enough to be applied with a brush, all excess of the material being scraped off before it hardens. The marble thus treated may be polished after it has hardened for two or three days.

To produce a fine polish and brilliant finish upon the surface of my artificial marble, I first rub the surface down after it has thoroughly hardened with a chunk or block of pumice-stone sprinkled with water and ground pumice-stone, and after cleaning off the surface with care let it stand in the sun or in a warm room two or three hours. I then rub it down with a smooth oil-stone or hone, and again allow it to stand two or three hours, as before. I next rub the smooth surface thus produced with a mixture of one part of olive-oil and two parts of gum-shellac, and when dry coat it over with a thin coat of copal varnish, and place it in a hot kiln, and expose it to the heat for ten hours. I next rub it down again with ground pumice-stone, wipe it off carefully, and finally rub it up with putty, varnish, or with white wax dissolved in benzine, (one-fourth pound of wax in one quart of benzine,) upon an old felt or woolen cloth until a beautiful and brilliant gloss is obtained.

Instead of using a mixture of cement and silex to produce an artificial marble with my zinc solution, as described, I contemplate making a paste or composition by moistening with my said solution either silex, clay, lime, chalk, gypsum, manganese, or any other earthy or mineral substance suitable for the purpose, alone and unmixed, as well as in mixtures or combinations of any two or more of said substances, for the purpose of molding the same into suitable forms and shapes by percussion or otherwise, as described.

Through a proper choice and selection of the silex, &c., forming the solid basis of my improved artificial marble, and by the use of proper coloring matter in connection therewith, every description of natural marble may be imitated, and endless varieties obtained at pleasure.

I reserve the right to vary somewhat the proportions of the several ingredients named, as well as the details of the manufacture, without impairing my right and title to an exclusive use thereof for the purposes specified by virtue of my said invention.

I claim as my invention—

1. The solution herein described of sulphate and chloride of zinc, sugar of lead, alum or salt, when combined with cement, silex, or any materials or substances, either singly or in combination, suitable as a base to form an artificial marble, all substantially as herein set forth.

2. The within-described process of polishing and finishing off an artificial marble, produced substantially in the manner herein set forth.

The foregoing specification of my improvement in artificial marbles signed by me this 11th day of July, 1870.

GEO. A. FREAR.

In the presence of—
CALVIN DEWOLF,
GEO. A. FOLLANSBEE.